United States Patent Office 2,946,779
Patented July 26, 1960

2,946,779
FRACTIONATION OF POLYOLEFINS

Herbert L. Johnson, Media, and William A. Henderson, Aldan, Pa., assignors to Sun Oil Company, Philadelphia, Pa., a corporation of New Jersey No Drawing. Filed Oct. 24, 1958, Ser. No. 769,286

4 Claims. (Cl. 260—93.7)

This invention relates to the fractionation of polyolefins such as polyethylene and polypropylene, and more particularly is directed to a process for the fractionation of solid polyolefins into fractions of various average molecular weights.

Olefins such as propylene, ethylene, butene-1, and 4-methyl pentene-1 or mixtures thereof, can be polymerized to relatively high-molecular-weight solid polymers by contacting the olefin with a dispersion of titanium trichloride and an activator such as aluminum triethyl maintained in an inert, liquid reaction medium. Generally, such processes produce solid polymers having molecular weights of above about 5,000 and usually within the range of from about 20,000 to 500,000 or more. A proportion of the solid products obtained with the mentioned catalyst appears crystalline, i.e., exhibits a crystalline structure by X-ray analysis. The crystalline polymer is relatively insoluble in the usual hydrocarbon solvents, such as the paraffins, including, for example, the pentanes, hexanes, octanes, decanes, and the like. Although the predominantly crystalline polymers possess properties which make them suitable for many applications, the described and comparable processes for preparing polyolefins results in the preparation of polymers of widely varying molecular weight. For example, the solid polymers will generally vary in molecular weight over the entire above-stated range of from 20,000 to 500,000 or more. This wide spread in molecular weight is deleterious in applications wherein sharply defined physical properties are desirable. For example, polyolefins consisting essentially of polymers having a narrow molecular weight spread are relatively easily processed by molding, extrusion or the like, since all of the polymers soften at about the same temperature, thus giving uniform results.

The fractionation of polyolefins to obtain polymers of narrow molecular weight ranges has been described. These prior processes involve successive extractions using a series of polymer solvents, usually aliphatic hydrocarbons, of increasing molecular weight. This process is not satisfactory, since only a small amount of the total polymer is soluble in these hydrocarbons below about 150–160° C., at which temperature the entire polymer goes into solution. An alternative procedure which involves complete solution of the polymer and the addition of incremental amounts of an anti-solvent to precipitate polymers of decreasing molecular weights is also unsatisfactory, because polymer so precipitated is exceedingly difficult to filter, and it is almost impossible to free the polymer of occluded solvent carrying lower molecular weight polymer.

It has now been found that successive fractions of increasing molecular weight may be separated from solid polyolefins by contacting a finely divided mass of polyolefin with from about five to about fifty, and preferably about ten times its weight, of an aromatic hydrocarbon, such as toluene or xylene, at a temperature in excess of 90° C., but below 145° C., with stirring, for a period of time sufficiently long to cause the polyolefin to become swollen and exhibit gel-like appearance and properties. From about 25 to about 200 weight percent, based on the aromatic, of a saturated aliphatic hydrocarbon is then added to the mixture, and heating is continued until the gel structure of the polyolefin breaks down to yield a material which may be easily separated from the liquid, as by decanting or filtration at temperatures in excess of 90° C. If the mixture is cooled to below 90° C. prior to separation of solid polyolefin, the solid will again set to a gel so that separation from the liquid is not readily accomplished. The reason for this odd behavior is not known.

It will be found that a portion of the solid polyolefin has been dissolved by the treatment, and this fraction may be recovered from the solvent by the addition of an antisolvent, such as methanol, or by evaporation of the solvent. The amount of polyolefin dissolved may be varied by varying the weight ratio of solvent to solid material, or by varying the temperature of contacting. The polyolefin recovered will be found to have a lower average molecular weight than the original sample of polyolefin.

The solid recovered from the first extraction is then re-contacted with solvent in the same manner as described above. The aromatic component of the solvent may be the same as that used in the original extraction, or it may be higher boiling, so that higher temperatures may be used, with consequent greater recovery of dissolved polyolefin. After the second extraction, the solvent is separated from undissolved polyolefin as before, and a second polyolefin fraction, of higher molecular weight than the first, is recovered from the solvent. This procedure may be repeated until the polyolefin has been separated into the desired number of fractions, each of higher average molecular weight and higher crystallinity than the preceding fraction. It is most important that the polyolefin be first contacted with the aromatic constituent of the solvent, prior to adding the aliphatic constituent, since if the procedure is reversed, or if mixed solvents are used, adequate fractionation is not obtained. It is not known which of the constituents is the true solvent for the polyolefin, but it is suspected that the aromatic acts primarily as a swelling agent, so that upon addition of the aliphatic, the latter is enabled to penetrate into the individual particles of polyolefin and effect dissolution thereof.

In order that those skilled in the art may more fully appreciate the nature of our invention, the following specific example is given.

A sample of polypropylene prepared by contacting propylene with a titanium trichloride-aluminum triethyl catalyst had an average molecular weight of 165,000, as determined by intrinsic viscosity measurement, and comprised 53 percent crystalline material, as determined by X-ray diffraction. Fifty grams of this material in powdered form, was mixed with 950 grams of normal heptane, and the mixture was then heated at reflux temperature for 6 hours. The liquid was then decanted from the solid. Upon evaporation of the liquid, a solid (fraction 1), which amounted to 7.6 percent of the weight of the original sample of propylene, was recovered. The procedure was repeated, and a second fraction amounting to 2 percent by weight of the original was recovered from the heptane.

The remaining undissolved polypropylene was then mixed with 500 grams of toluene and the mixture was heated at reflux temperatures for one and one half hours. At the end of this time, the polypropylene had swollen to a gel-like mass. Five hundred grams of n-heptane was then added, and the mixture was heated at reflux temperatures for an additional one and one half hours. At the end of this time, the liquid was decanted, and solvent was evaporated to recover a third fraction amounting to 34.7 percent by weight of the original polymer.

The undissolved portion was retreated as in the foregoing paragraph, and a fourth fraction amounting to 4.2 weight percent of the original polymer was recovered from the solvent.

The remaining undissolved polymer was then placed in 500 grams of xylene, and the mixture was heated at reflux temperature for one and one half hours, after which 500 grams of heptane was added and heating was continued at reflux temperatures for an additional one and one half hours. The mixture was then decanted, and a fifth fraction amounting to 17.6 percent of the original polymer was recovered from the solvent. This procedure was then repeated to yield a sixth soluble fraction amounting to 27.1 percent of the original polymer, together with an insoluble residue amounting to 6.8 percent of the original polymer.

Physical characteristics of all fractions are indicated in the following table.

Table I

| Fraction | Mol. Wt. Average | Percent Crystallinity | Wt. Ratio, Aromatic/Polymer |
|---|---|---|---|
| 1 | 21,000 | 39 | |
| 2 | 30,500 | 31 | |
| 3 | 88,000 | 58 | 11:1 |
| 4 | Not determined | Not determined | 17.5:1 |
| 5 | 198,000 | 67 | 19:1 |
| 6 | 226,000 | 63 | 30:1 |
| Residue | 293,000 | 67 | |

While in the foregoing example toluene and xylene were used as the aromatics, and the swelling of the polymer was carried out at the boiling point of the aromatic, benzene can be used if pressure equipment is available, so that the benzene can be kept in liquid phase at temperatures above 90° C. Similarly, higher boiling aromatics such as mesitylene, cumene, and the like may be used, if the temperature is kept below 145° C., since at higher temperatures the entire polymer will dissolve, and no fractionation can be had. Toluene and xylenes are preferred, however, since easy control of temperature is had by operating at reflux temperatures.

In the example, heptane was used as the aliphatic component of the mixed solvent because it had a convenient boiling point. However, any other aliphatic hydrocarbon, such as hexane, octane, nonane, or decane may be used, so long as the temperature is maintained between 90° C. and 145° C. When using hexane or lower boiling aliphatics, pressure equipment must, of course, be used.

While the example is limited to the fractionation of polypropylene, the process is equally applicable to the fractionation of other crystalline, high density polymers of 1-olefins such as polyethylene, polybutene-1, and the like. In the fractionation of such polymers, the size of each successive fraction may be regulated either by regulating the ratio of aromatic to polymer in the gelling step, or by controlling the temperature at which the extraction with the aliphatic hydrocarbon is carried out. If it is desired to obtain a number of fractions of approximately equal size, the ratio of aromatic to polymer should be increased with each successive extraction, if the extraction is carried out at the same temperature, or, if the ratio of aromatic to polymer is maintained constant, the temperature should be raised with each successive extraction. In any event, the exact ratio of aromatic and/or aliphatic solvent to polymer ratio to yield a fraction of the desired size and average molecular weight, and the most convenient operating temperature, must be determined experimentally for each batch of polymer, since it is virtually impossible to control the polymerization conditions from batch to batch in a manner to yield a uniform product.

The invention claimed is:

1. A process for the fractionation of polyolefins which comprises mixing a solid polymerization reaction product consisting of a mass of crystalline olefin polymer of varying molecular weights with from about five to fifty times its weight of a monocyclic aromatic hydrocarbon, maintaining the mixture at a temperature of from about 90° C. to about 145° C. for a period of time sufficient to cause the polymer to form a gel, adding to the mixture from about one quarter to twice the weight of the aromatic hydrocarbon of a liquid saturated aliphatic hydrocarbon having at least six carbon atoms, maintaining the temperature at from about 90° C. to about 145° C. for a time sufficient to break down the gel structure of the polymer, separating undissolved polymer from liquid containing dissolved polymer at a temperature in excess of 90° C., and recovering from the liquid a solid polymer having a lower average molecular weight than the undissolved polymer.

2. The process according to claim 1 in which the polymer is polypropylene.

3. The process according to claim 2 in which the aromatic hydrocarbon is toluene and the aliphatic hydrocarbon is n-heptane.

4. The process according to claim 2 in which the aromatic hydrocarbon is xylene and the aliphatic hydrocarbon is n-heptane.

References Cited in the file of this patent

UNITED STATES PATENTS

| 2,691,647 | Field et al. | Oct. 12, 1954 |
| 2,825,721 | Hogan et al. | Mar. 4, 1958 |